United States Patent
Irzyk

(10) Patent No.: US 9,880,385 B2
(45) Date of Patent: Jan. 30, 2018

(54) SYSTEM AND METHOD FOR PROJECTING AN IMAGE AND DISPLAY USING SAID SYSTEM

(71) Applicant: VALEO COMFORT AND DRIVING ASSISTANCE, Creteil (FR)

(72) Inventor: Michael Irzyk, Creteil (FR)

(73) Assignee: VALEO COMFORT AND DRIVING ASSISTANCE, Creteil (FR)

( * ) Notice: Subject to any disclaimer, the term of this patent is extended or adjusted under 35 U.S.C. 154(b) by 0 days.

(21) Appl. No.: 15/104,739

(22) PCT Filed: Dec. 18, 2014

(86) PCT No.: PCT/FR2014/000289
§ 371 (c)(1),
(2) Date: Jun. 15, 2016

(87) PCT Pub. No.: WO2015/092166
PCT Pub. Date: Jun. 25, 2015

(65) Prior Publication Data
US 2017/0023788 A1 Jan. 26, 2017

(30) Foreign Application Priority Data
Dec. 20, 2013 (FR) ..................... 13 03042

(51) Int. Cl.
*H04N 9/31* (2006.01)
*G02B 27/01* (2006.01)
(Continued)

(52) U.S. Cl.
CPC ....... *G02B 27/0101* (2013.01); *G02B 5/3016* (2013.01); *G02F 1/137* (2013.01);
(Continued)

(58) Field of Classification Search
CPC .. H04N 9/3155; H04N 9/3161; H04N 9/3167; H04N 9/3197; H04N 9/3105;
(Continued)

(56) References Cited

U.S. PATENT DOCUMENTS 6,476,966 B1 11/2002 Hernandez et al.
2005/0190345 A1 9/2005 Dubin et al.
(Continued)

FOREIGN PATENT DOCUMENTS

WO 95/20180 A1 7/1995
WO 01/88606 A1 11/2001

OTHER PUBLICATIONS

International Search Report issued in PCT/FR2014/000289 dated Mar. 26, 2015 (3 pages).
(Continued)

*Primary Examiner* — Sherrie Hsia
(74) *Attorney, Agent, or Firm* — Osha Liang LLP

(57) ABSTRACT

A method of projecting an image includes emitting a light beam, forming an image from the light beam, and attenuating the light beam by controlling an AC signal between two voltage levels. The image is formed by projecting image frames. The switching of the AC signal from one voltage level to the other is controlled between projections of the image frames.

8 Claims, 2 Drawing Sheets

Figure 1:
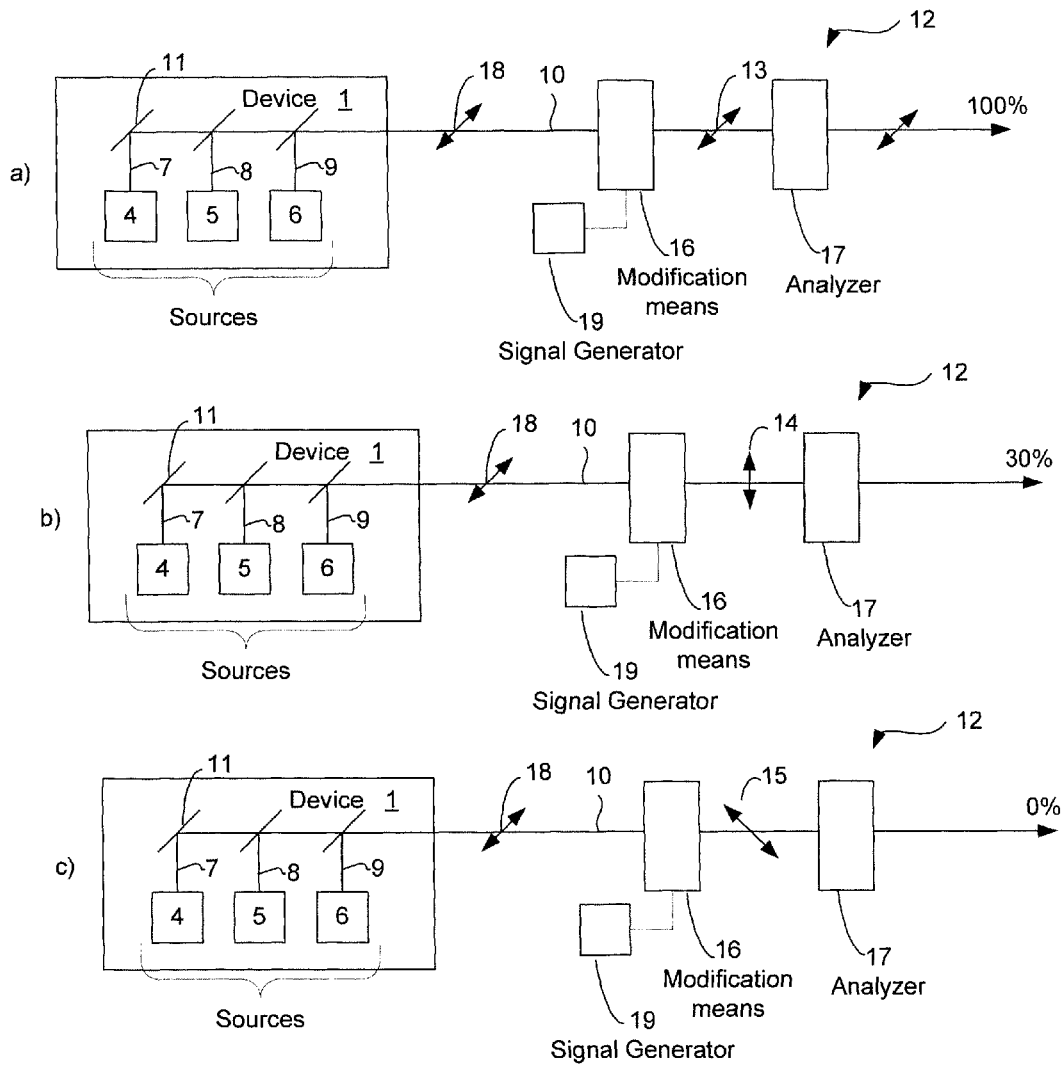

(51) Int. Cl.
*G02B 5/30* (2006.01)
*G03B 21/20* (2006.01)
*G02F 1/1368* (2006.01)
*G02F 1/137* (2006.01)

(52) U.S. Cl.
CPC ....... *G02F 1/1368* (2013.01); *G03B 21/2053* (2013.01); *G03B 21/2073* (2013.01); *H04N 9/3155* (2013.01); *H04N 9/3161* (2013.01); *H04N 9/3167* (2013.01); *G02B 2027/0118* (2013.01)

(58) Field of Classification Search
CPC ........ H04N 5/7441; H04N 3/127; H04N 9/31; H04N 9/30; H04N 3/14; H04N 5/74; G02B 2027/0118; G02B 27/0101; G02F 1/1368; G02F 1/137
USPC ....... 348/744, 766, 790, 751, 761, 791, 757; 345/7, 8, 30, 82, 87, 92, 102; 362/97.1–97.3
See application file for complete search history.

(56) References Cited

U.S. PATENT DOCUMENTS

2013/0016136 A1\* 1/2013 Yasui ..................... G02B 27/48
                                                          345/690
2013/0293591 A1   11/2013 Miller et al.

OTHER PUBLICATIONS

Written Opinion of the International Searching Authority issued in PCT/FR2014/000289 dated Mar. 26, 2015 (7 pages).

\* cited by examiner

SYSTEM AND METHOD FOR PROJECTING AN IMAGE AND DISPLAY USING SAID SYSTEM

1. TECHNICAL FIELD OF THE INVENTION

The invention relates to a system for projecting an image and a display using said system.

The invention will have applications, for example, in motor vehicles for informing the users of the vehicle, in particular its driver.

It is known to equip a motor vehicle with a so-called heads up display system. Such a system is placed in the field of vision of the motor vehicle driver and displays information relating to the status of the motor vehicle, the traffic or other.

In order not to interfere with driving, it is necessary that the brightness of the projected image is adapted to the ambient brightness. In particular, it is necessary that the optical power of the projected image is greatly different during a daytime journey and a journey at night or when passing through a tunnel.

With heads up displays using light emitting diodes, it has already been proposed to vary the brightness of the projected image by controlling the supply current of the diodes. Such devices allow satisfactory adaptation of the brightness. However, their daytime brightness is still inadequate.

In order to compensate for this defect, displays are known which use light sources of the laser type. However, the adaptation of the brightness provided in such a case by controlling the amount of current supplying the sources does not make it possible to sufficiently reduce the optical power of the image. By way of example, if it is considered that it is desired to have an optical power of the order of 10,000 $Cd/m^2$ in daytime driving conditions and of the order of 5 $Cd/m^2$ in night driving conditions, it is observed that it is necessary to reduce the brightness by a factor of 2,000 when changing from one of the driving conditions to the other.

In addition, in the scope of a motor vehicle heads up display, for safety reasons this reduction in brightness must not downgrade the image displayed, so as to ensure the driver good legibility of important information that can be displayed there.

2. OBJECTIVES OF THE INVENTION

The invention aims to overcome at least some of the drawbacks of known image projection systems and displays.

In particular, the invention also aims to provide an image projection system and a display which make it possible to effectively reduce the brightness of the light beam intended to form an image.

The invention also aims to provide, in at least one embodiment of the invention, an image projection system and a display which allow attenuation of the brightness of said beam without downgrading the quality of the image projected and displayed by the display.

3. DISCLOSURE OF INVENTION

To do this, the invention relates to an image projection system, comprising a device for emitting a light beam, means for forming an image from said light beam, said image being broken down into frames projected consecutively by said system, characterized in that said system comprises means for attenuating the optical power of the light beam, the attenuation means comprising:

- a liquid crystal cell, able to be controlled by an AC signal between two voltage levels, the cell modifying the orientation of a polarization of a light beam controlled by the AC signal,
- a signal generator generating the AC signal, said signal generator switching said AC signal from one voltage level to the other between the projections of two consecutive frames of the image,
- means for ensuring the variation of the optical power of the light beam depending on the orientation of said polarization.

A system according to the invention attenuates the light beam through the attenuation means situated downstream of the existing emission device without modification thereof. The attenuation means comprise a liquid crystal cell which makes it possible, on command, to change the polarization direction of the light beam, which ensures the attenuation of the light beam. The liquid crystal cell is controlled by an electrical signal applied across the terminals of the liquid crystal cell, the voltage value of which modifies the orientation of the polarization: the polarization and thus the attenuation is a function of the absolute value of the voltage across the terminals of the crystal. The use of an AC electrical signal between two voltage levels allows the voltage value to be modified regularly to avoid very rapid degradation of the liquid crystal cell which occurs if it is supplied with a DC signal.

The alternation between the two voltage levels takes place between the projection of two frames of the image to thereby avoid any image degradation likely to create safety problems if the projection system is installed in a vehicle heads up display. Several frames can be projected between two alternations, and, preferably, a single frame is projected between two alternations, i.e. the alternation occurs between each frame projection.

Advantageously and according to a variant of the invention, the light beam emission device comprises at least one laser diode.

Advantageously and according to another variant of the invention, the light beam emission device is a liquid crystal display type cell comprising a thin-film transistor, illuminated by a backlight.

These two variants are technologies frequently used in the field of projection and image display: the laser diode is used alone for a monochromatic light beam, or in combination with three laser diodes for a conventional polychromatic light beam. The liquid crystal display technology comprising a thin-film transistor is commonly referred to as TFT-LCD (for Thin-Film Transistor Liquid Crystal Display). Backlighting is generally carried out by means of a light emitting diode (LED). Both variants have the advantage of providing sufficient brightness for a system according to the invention, and to emit polarized light, which makes it unnecessary to polarize the beam situated downstream of the emission device.

Advantageously and according to the invention, the mean value of the AC signal voltage is zero.

According to this aspect of the invention, the service life of the liquid crystal cell is improved compared with the use of a DC or AC signal with a non-zero mean that more rapidly downgrades the liquid crystal cell.

Advantageously and according to the invention, the two voltage levels are equal absolute values and of opposite signs.

According to this aspect of the invention, the two voltage levels have the same absolute value which allows the same result to be obtained in terms of the polarization direction caused by the liquid crystal cell. Thus, the alternation of the signal does not modify the polarization direction, and therefore does not modify the attenuation of the light beam.

Advantageously and according to the invention, the AC signal is periodic.

According to this aspect of the invention, a conventional periodic AC signal generator, well known to those skilled in the art, can be used as a signal generator, and thus easily adjust the frequency of the AC signal controlling the liquid crystal cell.

Advantageously and according to the latter aspect of the invention, the frequency of the periodic AC signal is equal to half the projection frequency of the frames of the image.

According to this aspect of the invention, the switching of the periodic AC signal from one voltage level to another takes place between each frame projection.

The invention also relates to a display, notably a heads up display, comprising an image projection system according to the invention.

A display according to the invention allows the projected by the image projection system to be displayed. In the case of a heads up display installed in a vehicle for example, the display allows the driver of the vehicle to have information relating to driving status, the vehicle and/or the environment in his/her field of vision.

The invention also relates to method for projecting an image, said method comprising a step of emitting a light beam and a step of forming an image from said light beam, said image forming step being broken down into several consecutive sub-steps of image frame projection, characterized in that said method comprises a step of attenuating the light beam by controlling an AC signal between two voltage levels, the switching of the AC signal from one voltage level to the other being controlled between the consecutive sub-steps of image frame projection.

4. DESCRIPTION OF FIGURES

Figure 2:
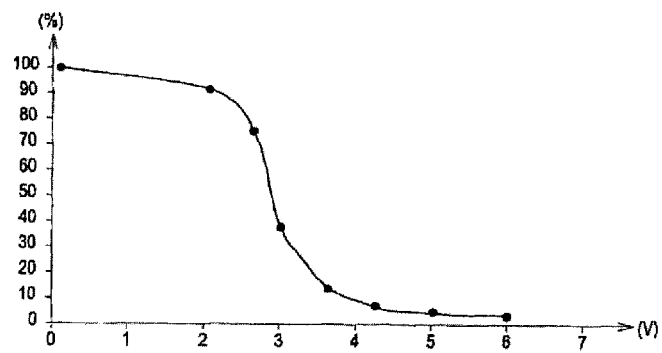
Figure 3:
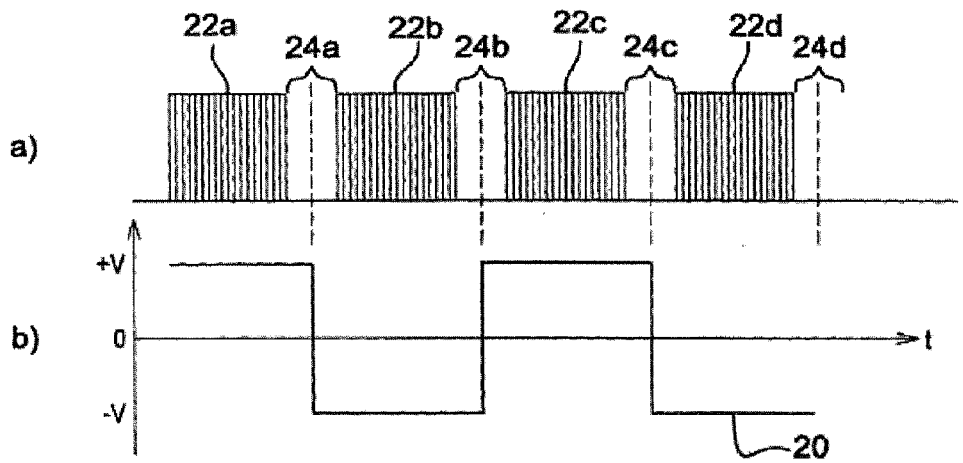
Figure 4:
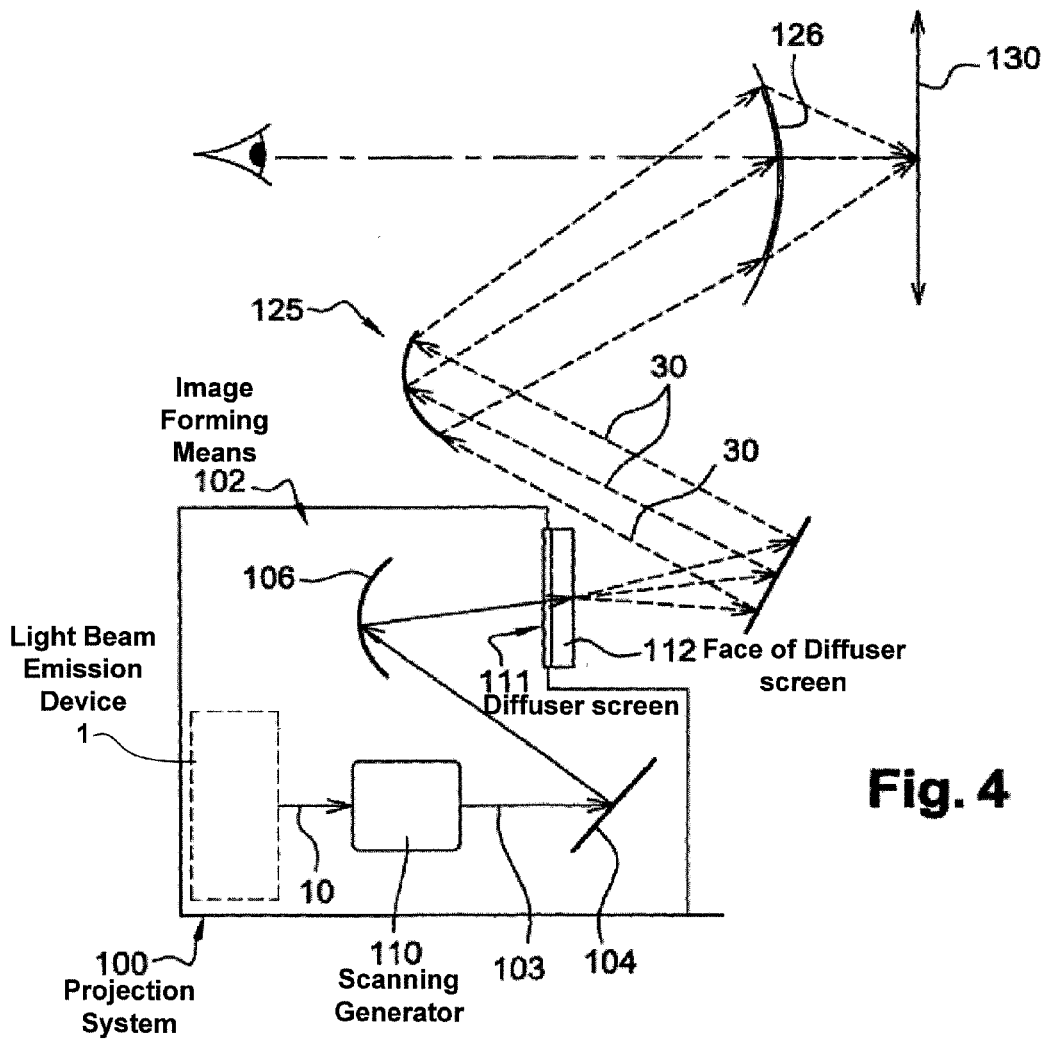

Other features, objects and advantages of the invention will emerge more clearly on reading the description given hereafter as an indication and with reference to the drawings in which:

FIG. 1 is a schematic view of an emission device and means for attenuating an image projection system according to an embodiment of the invention, in several operating modes a), b) and c), FIG. 2 is an example of a curve representing the optical power of the beam, expressed in percentage (Y-axis), as a function of the voltage applied at the terminals of a liquid crystal cell of a system according to the invention, expressed in volts (X-axis), FIG. 3 is a timing diagram representing the series of frames (a) and the AC signal (b) controlling the liquid crystal cell of the attenuation means of the system according to the invention, based on the time (X-axis), FIG. 4 represents a schematic view of an image projection system and a heads up display according to the invention.

5. DETAILED DESCRIPTION OF AN EMBODIMENT OF THE INVENTION

It should be noted that the figures disclose the invention in a detailed manner in order to use the invention, it being possible of course for said figures to be used for better defining the invention as necessary.

As shown in FIG. 1, in the operating modes a), b) and c), the invention firstly relates to a projection system comprising a device 1 for emitting a light beam, intended to form an image. Such a device is more particularly intended to equip a heads up display in a motor vehicle, wherein at least information related to the vehicle is projected.

Said device comprises one or more sources 4, 5, 6, each emitting a beam 7, 8, 9 of the laser type. They are, for example, laser sources, typically laser diodes, each laser source emitting a monochromatic beam, that is to say consisting of a single wavelength.

Said device here comprises a plurality of sources 4, 5, 6, three of them in this case, said device being configured to form the light beam 10 by bringing the beams 7, 8, 9 individually emitted by each of said sources 4, 5, 6 together in combination. More precisely, they may be sources emitting a beam of color different from one source to another. The colors are, for example, red, green or blue (RGB).

The optical power of each of the sources is controlled independently, using the laser or source of the supply current. At a given optical power, the color of the light beam 10 is determined by the way in which a power ratio is established between the different laser diodes. For example, in order to obtain white light, the optical powers, in proportion, must be established according to the following distribution: 60 for the green diode, 30 for the blue diode, 10 for the red diode. As described below, the optical power of each of the sources can also be controlled in order to modulate the optical power of the light beam 10.

The beams 7, 8, 9 emitted by each source are oriented, for example, parallel with each other and reflect in the same direction in order to form said common light beam 10 by combination. To this end, said device 1 here comprises optical elements that are semi-transparent, over a range of wavelengths, such as dichroic mirrors or combining plates 11, intercepting the beams 7, 8, 9 emitted by each of said sources and combining them in the direction of said beam 10.

More generally, said device 1 is configured to form said light beam 10 from said laser beam or beams 7, 8, 9, however many sources 4, 5, 6 may be involved. In the case of a single source, the light beam 10 is composed of the laser beam emitted by the single source used and the image obtained will then be monochromatic, composed of the different optical powers applied to each of the points forming it, according to a gradation of said color. In the case of a plurality of sources, typically the three sources 4, 5, 6 mentioned above, said common beam 10 which then forms said light beam will allow the establishment of an image according to a color spectrum whose resolution will correspond to the fineness of control of the power supply of said sources 4, 5, 6.

According to the invention, the image projection system comprises attenuation means 12, situated downstream of said source or sources 4, 5, 6, making it possible to vary the optical power of the light beam 10. In other words, a color and/or an intensity being conferred on the light beam 10 by controlling the current supply of the sources, said attenuation means 12 make it possible to vary the optical power of the beam or beams 7, 8, 9, 10. In particular, it will be possible to adapt the optical power of the beam to daytime driving conditions and to night driving conditions.

Said device can comprise means of controlling the current supply of said sources. As mentioned above, they make it possible to choose the color of the light beam 10.

More precisely, said control means are configured, for example, to provide linear current regulation of the optical power of said laser beams 7, 8, 9 in order to provide said choice of color of the light beam 10, according to a proportion of optical power allocated to each of said laser beams 7, 8, 9. It is possible, for example, to provide an encoding of the color in six bits, corresponding to sixty four levels of optical power for each of said laser beams 7, 8, 9.

Said control means can also be configured to provide an additional adjustment of the optical power of said light beam. A particularly high attenuation rate can be achieved in this way.

More precisely, said control means are configured to provide regulation by pulse width modulation of the optical power of said laser beams 7, 8, 9 so as to ensure said additional adjustment of the optical power of said light beam 10, notably according to an attenuation factor of between 5 and 20, in particular of about 10.

In this way it is possible to adjust the color and/or the optical power of said light beam 10. Said control means comprise, for example, a microcontroller, which is not shown.

Advantageously, said attenuation means 12 are configured to vary the optical power of the light beam according to an orientation of a polarization of said beam or beams. In this way it is possible to take advantage of a physical feature of the laser beams, namely that they have the property of being highly polarized. For simplicity, it is considered that there is a ratio of 200/1 between the brightness associated with each of the two orthogonal components of the polarization of a laser beam. In this way it is possible to obtain an attenuation factor of about 200 which, combined with the attenuation factor coming from the control means, in particular form the pulse width modulation, makes it possible to reach the level of 2,000 mentioned above.

According to the embodiment illustrated, said attenuation means 12 comprises means 16 for modifying the orientation of the polarization of said beam or beams and, situated downstream, means ensuring the variation of the optical power of said light beams according to the orientation of said polarization, here an analyzer 17 transmitting only one of the components of the polarization of said beam or beams. Here, the beam 10 has an initial orientation 18, before passing through the orientation modification means 16. In the operating mode a), said means 16 for modifying the orientation of the polarization allow the beam to pass without changing the orientation of its polarization and the orientation 13 obtained at the output of said modification means enables transmission of near 100% of the beam through the analyzer 17 to be obtained. In the operating mode b), said means 16 for modifying the orientation of the polarization inflict an orientation change on the polarization according to a first angle and the orientation 14 obtained at the output of said modification means 16 allows transmission of 30% of the beam through the analyzer 17. In the operating mode c), said means 16 for modifying the orientation of the polarization inflict an orientation change on the polarization so that the new orientation 15 obtained is shifted orthogonally to the polarization orientation of the incident beam 10. The transmission of the beam through the analyzer 17 is then minimum, as symbolized by the number 0%.

Said means 16 for modifying the orientation of the polarization comprise, for example, liquid crystal means such as a liquid crystal cell. Said analyzer 17 is, for example, a polarizing film.

In another embodiment, the emission device may be composed of a liquid crystal display comprising a thin-film transistor (TFT-LCD for Thin-Film Transistor Liquid Crystal Display). This liquid crystal display is backlit by light emitting diodes (LEDs). Such a device also provides a highly polarized light beam due to the presence of polarizing films in the liquid crystal screen.

Throughout the description, the means 16 for modifying the orientation of the polarization is a liquid crystal cell 16. The liquid crystal cell 16 is controlled by a signal generated by a signal generator 19. The variation of the voltage provided by the signal at the terminals of the liquid crystal cell 16 allows adjustment of the direction of polarization of the light beam 10 that passes through it. In the context of the invention, this voltage variation thus translates into a variation in the optical power of the light beam 10 due to the attenuation thereof by attenuation means 12. FIG. 2 is a graph illustrating an example of this variation of the optical power of the light beam 10, expressed as a percentage based on the absolute value of the voltage at the terminals of the liquid crystal cell 16, expressed in volts.

A conventional liquid crystal cell must be controlled by an AC signal. The application of a DC signal at the terminals of a liquid crystal cell considerably reduces its service life. In addition, the application of opposite voltages to a liquid crystal cell, that is to say of the same absolute value but different signs, allows the same result to be obtained in terms of attenuation. Thus, the signal can be varied alternatively.

The image projected by the image projection system is, in a manner known in the art, broken down into successively projected frames, at a given projection frequency. In the case of a projection based on scanning of a screen by a light beam deflected by a scanning means, a frame corresponds to one complete scan of the screen by the light beam. Between these two frames, the scanning means must return to its initial position for a short time interval during which no frame is projected. Thus, according to the invention, the AC signal between the two voltage levels is alternated between two of these frame projections, that is to say during this time interval in which the beam is not deflected on the screen by the scanning means as it returns to its starting position. In this manner, the image distortions that occur when signal alternation takes place during the projection of a frame are avoided. A non-downgraded image is thus obtained, which is essential for using the projection system in a heads up display in a motor vehicle, for reasons of safety and comfort.

FIG. 3*b* represents such an AC signal used by the system according to the invention. The signal is represented by a curve 20, expressing the voltage of the signal as a function of time. This curve 20 is in parallel with the series of frames projected by the system, as a function of time (FIG. 3*a*). Four frames 22*a*, 22*b*, 22*c*, 22*d* are represented, and a time interval 24*a*, 24*b*, 24*c*, 24*d* occurs after each frame and before a new frame during which the scanning means returns to its initial position and thus no frame is displayed. It is at this time that the signal can alternate from one voltage level to another without downgrading the image. In the embodiment represented, the alternation takes place between each frame projection, but the signal may also alternate every two, three or x frames, as well as it can rotate in an irregular and non-periodic manner.

Preferably, the AC signal varies between a positive value and an opposite negative value to obtain constant attenuation.

Preferably also, the mean value of the AC signal voltage is zero. This allows the service life of the liquid crystal cell to be increased further as a non-zero mean is equivalent to using a non-zero DC signal that damages the liquid crystal cell.

More preferably still, the signal is periodic. A periodic AC signal is more easily generated by a conventional signal generator known to those skilled in the art. Advantageously, the frequency of the signal is equal to half the frame projection frequency. For example, the frame projection frequency may be 60 Hz and the frequency of the signal may be 30 Hz.

The signal represented by curve 20 in FIG. 3b is thus a signal according to an embodiment combining the aforementioned characteristics: it is a periodic signal, with zero mean and whose +V and −V voltage levels are opposite. Its frequency is equal to half the frame projection frequency, that is to say that the alternation from one voltage level to another takes place between each frame projection. The signal represented by the curve 20 is a perfect square signal, which alternates directly between the two voltage levels and that takes only these two voltage levels as a value, without an intermediate value. In practice, a square signal used in the invention may take on negligible intermediate values during a limited time, during the alternations from one voltage level to another.

As shown in FIG. 4, the invention also relates to a heads up display comprising an image projection system 100 according to the invention. The projection system 100 furthermore comprises, besides the light beam emission device 1, means 102 of forming an image from said light beam 10.

Said image forming means 102 comprise, for example, a scanning generator 110 whose function is to move the light beam 10 horizontally and vertically for the purpose of providing a beam 103 scanning at a frequency, notably equal to 60 Hz, as a non-limiting example. The scanning generator 110 comprises, for example, a scanning mirror having a micro-electro-mechanical system (hereafter called MEMS mirror) upon which the light beam 10 is reflected as a scanning beam 103. Such a MEMS mirror has for example a diameter of 1 mm². The MEMS mirror is able to rotate about two axes of rotation in order to produce a scanning, for example at the refresh frequency of 60 Hz, of a diffuser screen 111 of said image forming means 102. Said image is formed on said diffuser 111. Alternatively, the MEMS mirror can be replaced by two movable and flat mirrors, the movements of which are coupled. One of these mirrors can be dedicated to scanning along a horizontal axis whilst the other mirror can be dedicated to scanning along a vertical axis.

The diffuser 111 where the image is formed can be a transparent projection screen having a complex structure for projection by transparency. Alternatively, it can be translucent. It is made, for example, from glass, notably frosted, or from polycarbonate. By way of example, the diffuser screen is of the exit pupil ("Exit Pupil Expander") type. It makes it possible to have a widened observation cone. It extends in a plane traversed by the light beam, the image resulting from this scanning beam 103 being formed in the plane of a face of the diffuser screen 111.

This diffuser screen receives the scanning beam 103. It is arranged to cause dispersion of this scanning beam 103 in an angular sector, for example, equal to 30° with respect to the direction of the scanning beam 103 at the moment it strikes the diffuser screen 111. In order to do this, according to a non-limiting example, a face 112 of the diffuser screen is rough, in the sense that it comprises asperities which cause the dispersion of the scanning beam 103. The rough face 112 corresponds to the one through which the beam exits, that is to say the face upon which the image is formed.

According to another variant which is not shown, said image forming means do not comprise a scanning generator, such as previously described, but a micromirror array (also called digital micromirror system). In this configuration the image is formed at the level of the micromirror array and then projected onto the diffuser screen. In general, projection optics are placed between the array and the screen. Each micromirror corresponds to a pixel of the image. In this embodiment, the image is not formed for the first time on the diffuser screen but an image previously formed on the micromirror array is received.

It should be noted that the attenuation means 12 can be arranged, as shown in FIG. 1, upstream of said image forming means 102. They can also be downstream. In a variant, they can be placed between the scanning generator 110 or the micromirror array, on the one hand, and the diffuser screen 111 on the other hand.

Said projection system can furthermore comprise various flat or concave mirrors 104, 106 so as to focus the beams toward the diffuser screen 111, situated notably in the path of the scanning beam 103.

The invention also relates to a display, notably a heads up display, comprising a projection system 100 according to any one of the variants described above.

Downstream of the diffuser screen 111 in the direction of movement of the light beam, said display comprises at least a semi-reflective plate 126 and a reflection device 125 interposed in the path of the image between the diffuser screen 111 and the semi-reflective plate 126, the reflection device 125 comprising one or more flat or concave mirrors, as shown in FIG. 4. In this figure, the path of the image is symbolized by three arrows 30 shown in dotted line which reflect on the reflection device 125 before being displayed through the semi-reflective plate 126. The latter allows an enlargement and/or, by transparency, a display of the image beyond said semi-reflective plate, notably beyond the windshield of the equipped vehicle, at the level of a virtual screen 130, obtained with the help of said semi-reflective plate 126.

This transparent plate has a reflection power at least equal to 20%, which allows the user to see the route taken by the vehicle through the plate, whilst benefiting from a high contrast making it possible to see the displayed image. Alternatively, the display of the image can take place on the windshield of the vehicle equipped with said display.

As already stated, said attenuation means 12 can be situated downstream of the image forming device 102 and as far as the semi-reflective plate 126.

The invention claimed is:
1. An image projection system, comprising:
a device for emitting a light beam;
means for forming an image from said light beam, said image being broken down into frames projected consecutively by said system;
means for attenuating the optical power of the light beam, the attenuation means comprising:
a liquid crystal cell, able to be controlled by an AC signal between two voltage levels, the cell modifying the orientation of a polarization of a light beam controlled by the AC signal,
a signal generator generating the AC signal, said signal generator switching said AC signal from one voltage level to the other between the projections of two consecutive frames of the image, and
means for ensuring the variation of the optical power of the light beam depending on the orientation of said polarization,
wherein a frequency of the AC signal is equal to half a projection frequency of the frames of the image.
2. The image projection system as claimed in claim 1, wherein the device for emitting the light beam comprises at least one laser diode.

3. The image projection system as claimed in claim 1, wherein the device for emitting the light beam is a liquid crystal display type cell comprising a thin-film transistor, illuminated by a backlight.

4. The image projection system as claimed in claim 1, wherein the mean value of the AC signal voltage is zero.

5. The image projection system as claimed in claim 1, wherein the two voltage levels are equal absolute values and of opposite signs.

6. The image projection system as claimed in claim 1, wherein the AC signal is periodic.

7. A heads up display, comprising an image projection system as claimed in claim 1.

8. A method for projecting an image, said method comprising:
- emitting a light beam;
- forming an image from said light beam, said image forming step being broken down into several consecutive sub-steps of image frame projection; and
- attenuating the light beam by controlling an AC signal between two voltage levels, the switching of the AC signal from one voltage level to the other being controlled between consecutive sub-steps of image frame projection,
- wherein a frequency of the AC signal is equal to half a projection frequency of the image frame projection.

* * * * *